(12) United States Patent
Takei et al.

(10) Patent No.: US 12,510,151 B2
(45) Date of Patent: Dec. 30, 2025

(54) INSPECTION DEVICE, INSPECTION METHOD, AND VEHICLE

(71) Applicant: HONDA MOTOR CO., LTD., Tokyo (JP)

(72) Inventors: Yasuhito Takei, Wako (JP); Tsutomu Kamiyamaguchi, Wako (JP); Shuji Kawano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 18/778,260

(22) Filed: Jul. 19, 2024

(65) Prior Publication Data

US 2025/0035209 A1    Jan. 30, 2025

(30) Foreign Application Priority Data

Jul. 26, 2023    (JP) ................................ 2023-121890

(51) Int. Cl.
  *F16H 61/12*    (2010.01)
  *G01M 13/021*   (2019.01)

(52) U.S. Cl.
  CPC .......... *F16H 61/12* (2013.01); *G01M 13/021* (2013.01); *F16H 2061/1216* (2013.01); *F16H 2061/1256* (2013.01)

(58) Field of Classification Search
  CPC .......... F16H 205/012; F16H 2061/126; F16H 2061/1256; G01M 13/021
  See application file for complete search history.

(56) References Cited

U.S. PATENT DOCUMENTS

| 12,398,796 B2* | 8/2025 | Tanila ................. G01M 13/025 |
| 2024/0424908 A1* | 12/2024 | Brolles ................ G01R 31/343 |

FOREIGN PATENT DOCUMENTS

JP        2007-121151 A       5/2007

* cited by examiner

Primary Examiner — Huan Le
(74) Attorney, Agent, or Firm — Thomas Horstemeyer, LLP

(57) ABSTRACT

An inspection device for inspecting a vehicle in which drive force generated by a motor is transmitted to a drive wheel via a plurality of gears is provided. The inspection device includes a generation unit configured to cause the motor to generate torque in two rotation directions different from each other, in a state in which the vehicle is stopped, and an estimation unit configured to estimate worn states of the plurality of gears, based on a rotation amount of the motor in accordance with the torque in the state in which the vehicle is stopped.

9 Claims, 5 Drawing Sheets

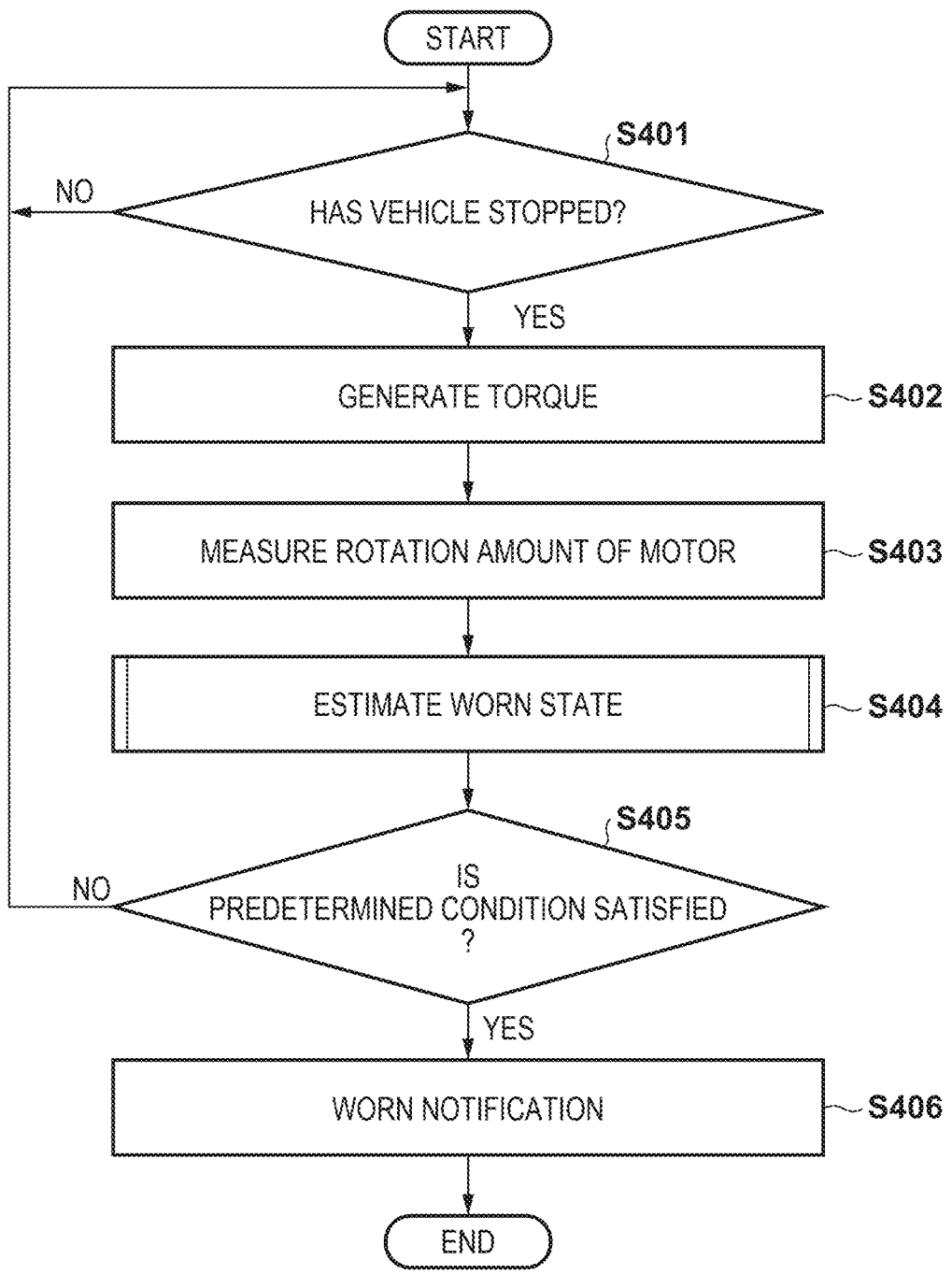

INSPECTION DEVICE, INSPECTION METHOD, AND VEHICLE

CROSS-REFERENCE TO RELATED APPLICATION(S)

This application claims priority to and the benefit of Japanese Patent Application No. 2023-121890, filed Jul. 26, 2023, the entire disclosure of which is incorporated herein by reference.

BACKGROUND OF THE INVENTION

Field of the Invention

The present invention relates to an inspection device, an inspection method, and a vehicle.

Description of the Related Art

A vehicle includes gears for transmitting drive force generated by a drive source to drive wheels. The gears are worn, as the vehicle travels. A largely consumed gear has to be replaced. It is complicated to disassemble the vehicle, take out such a gear, and confirm a consumed state of the gear. Japanese Patent Laid-Open No. 2007-121151 proposes a technique of estimating the consumed state of a gear with use of a laser, without taking out the gear. In the technique described in such a document, the consumed state of the gear is estimated with use of the laser, and thus the structure can be complicated.

SUMMARY OF THE INVENTION

According to some aspects of the present disclosure, a consumed state of a gear of a vehicle is estimated with a simple configuration. According to an embodiment, an inspection device for inspecting a vehicle in which drive force generated by a motor is transmitted to a drive wheel via a plurality of gears, the inspection device comprising: a generation unit configured to cause the motor to generate torque in two rotation directions different from each other, in a state in which the vehicle is stopped; and an estimation unit configured to estimate worn states of the plurality of gears, based on a rotation amount of the motor in accordance with the torque in the state in which the vehicle is stopped is provided.

BRIEF DESCRIPTION OF THE DRAWINGS

FIG. 4 is a flowchart for describing an example of an inspection method according to some embodiments.

DESCRIPTION OF THE EMBODIMENTS

Figure 1:
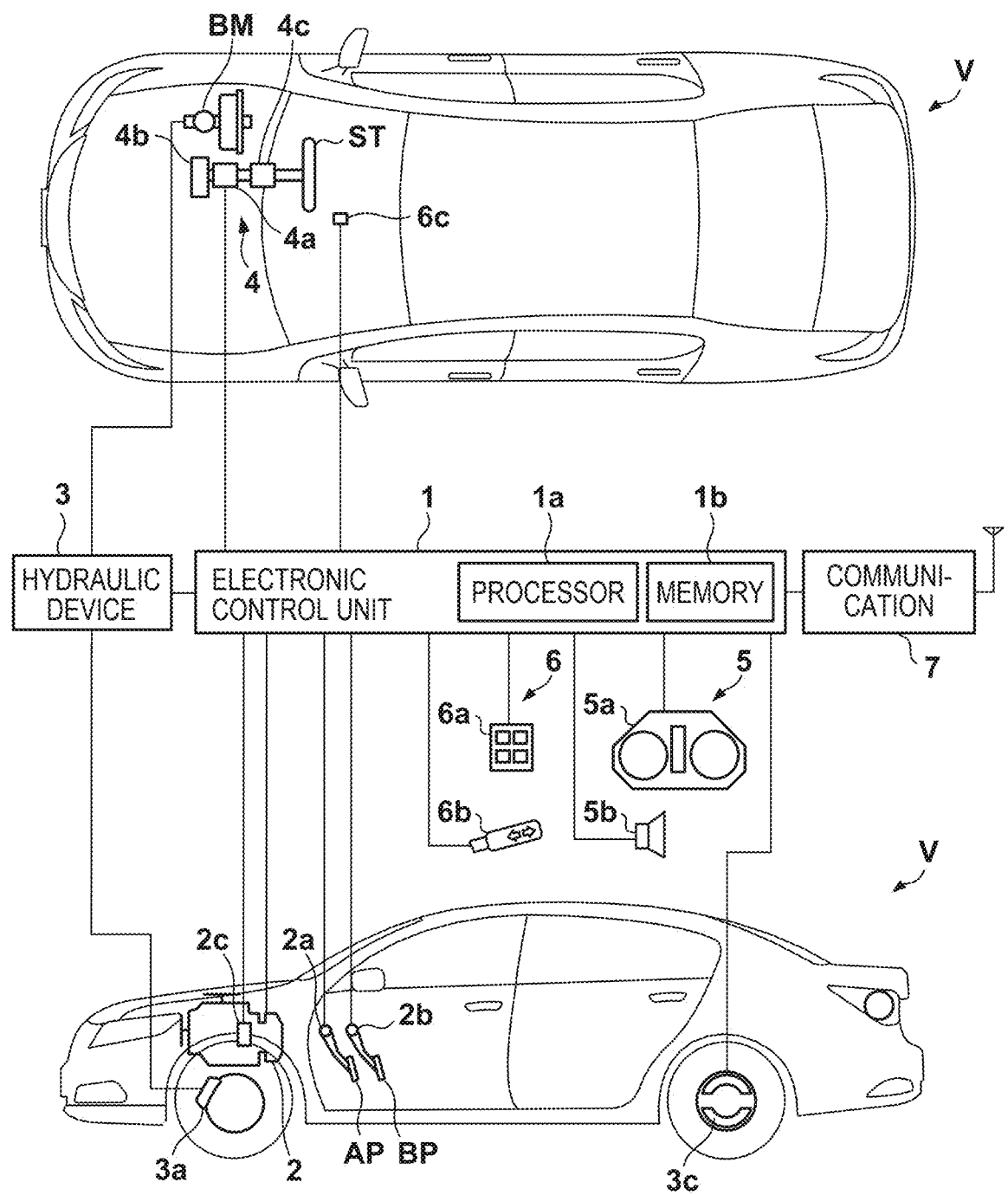
FIG. 1 is a schematic diagram for describing a configuration example of a vehicle according to some embodiments.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<Configuration of Vehicle>

Referring to FIG. 1, a configuration example of a vehicle V according to some embodiments will be described. FIG. 1 illustrates a plan view and a side view of the vehicle V. The vehicle V may include component elements illustrated in FIG. 1. The vehicle V may further include a component element not illustrated in FIG. 1, or may not necessarily include some of the component elements illustrated in FIG. 1. The vehicle V may be a vehicle including a motor as the drive source. For example, the vehicle V may be an electric vehicle, or may be a hybrid vehicle. The vehicle V may be a four-wheeled vehicle, a two-wheeled vehicle, or any other vehicles. The vehicle V may be an automated driving vehicle having a drive support function of automatically traveling without necessitating a driving operation by an occupant, or may be a vehicle without including such a drive support function. In FIG. 1, a case where the vehicle V is a four-wheeled electric vehicle will be described.

An electronic control unit 1 functions as a control device that controls a plurality of component elements of the vehicle V including a power unit 2, a hydraulic device 3, and the like. The electronic control unit 1 may include one electronic control unit (ECU), or may include a plurality of ECUs. The plurality of ECUs may control different component elements (the power unit 2, the hydraulic device 3, and the like).

The electronic control unit 1 includes a processor 1a, which is represented by a central processing unit (CPU), a memory 1b such as a semiconductor memory, an interface (not illustrated) with other devices, and the like. The memory 1b stores programs to be executed by the processor 1a, data used for processing by the processor 1a, and the like. The interface may include an input and output interface and a communication interface.

The electronic control unit 1 controls the power unit 2 to control driving (acceleration) of the vehicle V. The power unit 2 is a traveling drive unit that generates drive force (torque) for rotating drive wheels of the vehicle V. The electronic control unit 1 controls output of the power unit 2 in response to a driver's driving operation detected by an operation detection sensor 2a, which is provided on an accelerator pedal AP, or an operation detection sensor 2b, which is provided on a brake pedal BP. The electronic control unit 1 may measure the speed of the vehicle V, based on the rotation speed of the wheel that has been detected by a wheel speed sensor 2c.

The electronic control unit 1 controls the hydraulic device 3 to control braking (deceleration) of the vehicle V. The hydraulic device 3 is an actuator capable of controlling the hydraulic pressure of the hydraulic oil supplied to a brake device 3a (for example, a disc brake device) provided on each of the four wheels, based on the hydraulic pressure transmitted from a brake master cylinder BM. By conducting drive control of an electromagnetic valve or the like included in the hydraulic device 3, the electronic control unit 1 is capable of controlling braking of the vehicle V.

The electronic control unit 1 controls an electric power steering device 4 to control steering of the vehicle V. The electric power steering device 4 includes a mechanism that steers the front wheels in response to a driver's driving operation (steering operation) on a steering wheel ST. The electric power steering device 4 may include a drive unit 4*a*, which includes a motor that exerts drive force for assisting the steering operation, a steering angle sensor 4*b*, a torque sensor 4*c*, which detects steering torque loaded on the driver, and the like.

The electronic control unit 1 controls an information output device 5, which notifies the inside of the vehicle of information. The information output device 5 may include, for example, a display device 5*a*, which notifies the driver of information by images, and a sound output device 5*b*, which notifies the driver of information by sounds. The display device 5*a* may include, for example, a display device provided on an instrument panel or a display device provided on the steering wheel ST. The display device 5*a* may include a head-up display. The information output device 5 may notify the occupant of information by vibration or light.

The electronic control unit 1 receives an instruction input from the driver via an input device 6. The input device 6 is disposed in a position operable by the driver, and may include, for example, a switch group 6*a* for the driver to give an instruction to the vehicle V, a blinker lever 6*b* for actuating a direction indicator (blinker), and a shift lever 6*c* for giving an instruction of a shift position. The switch group 6*a* may include a switch for giving an instruction to actuate an electric parking brake. In response to an instruction to actuate the electric parking brake from the driver, the electronic control unit 1 controls an electric parking brake device 3*c*, which is provided on the rear wheel, and maintains the vehicle V in a stopped state. Instead of an electric parking brake mechanism, the vehicle V may include a parking brake mechanism to be actuated in response to an operation on a parking lever or a parking pedal by the driver.

The shift position settable by the shift lever 6*c* may include a drive range to be used for moving the vehicle V forward, a reverse range to be used for moving the vehicle V rearward, a parking range to be used for maintaining the stopped state of the vehicle V, and a neutral range for causing the drive force of the power unit 2 not to be transmitted to the drive wheels.

The electronic control unit 1 may communicate with a device outside the vehicle V, by using a communication device 7. The communication device 7 may communicate on wireless communication or wired communication.

<Configuration Example of Power Unit>

Figure 2:
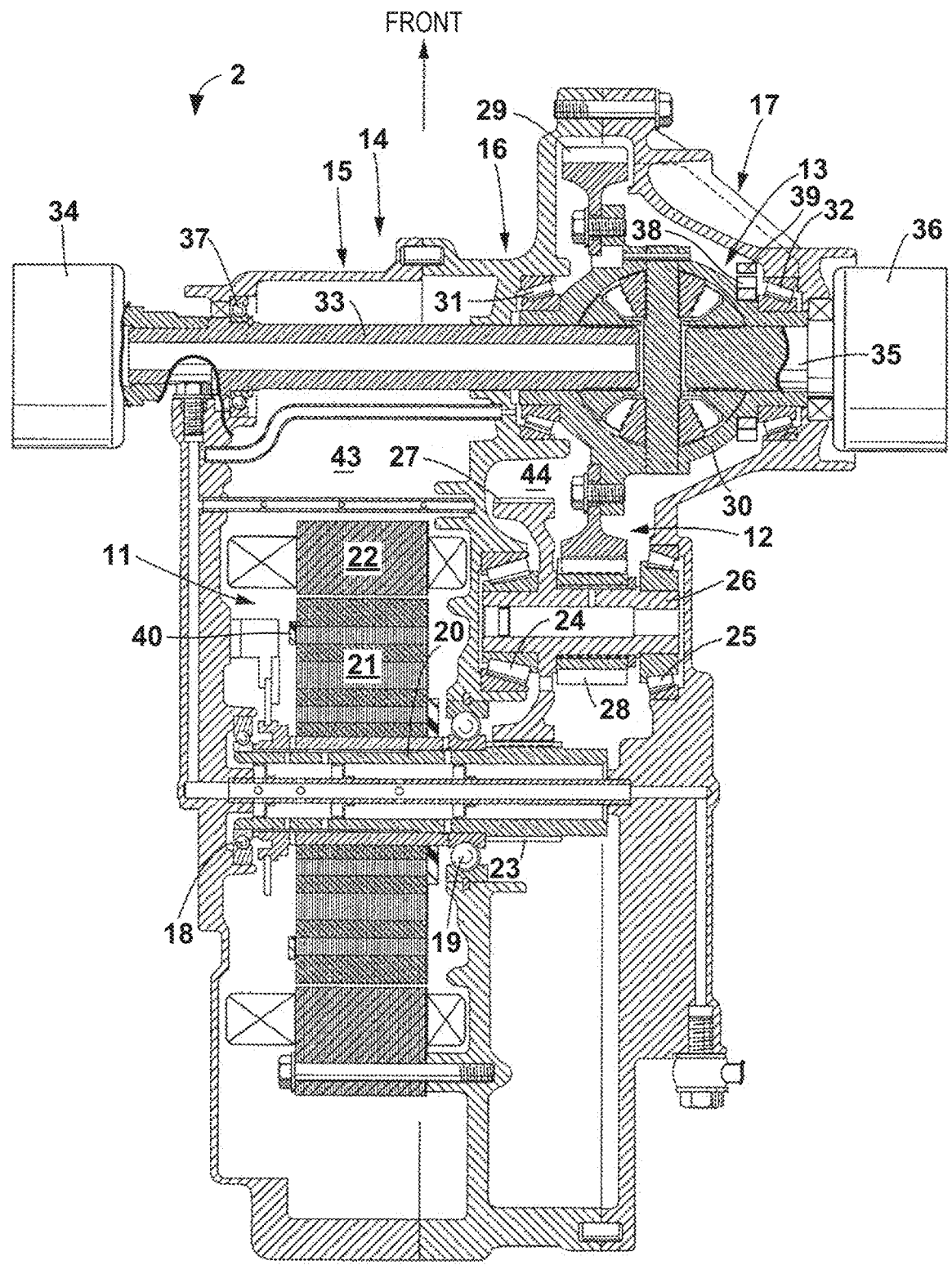
FIG. 2 is a schematic cross-sectional view for describing a configuration example of a power unit according to some embodiments.
Figure 3A:
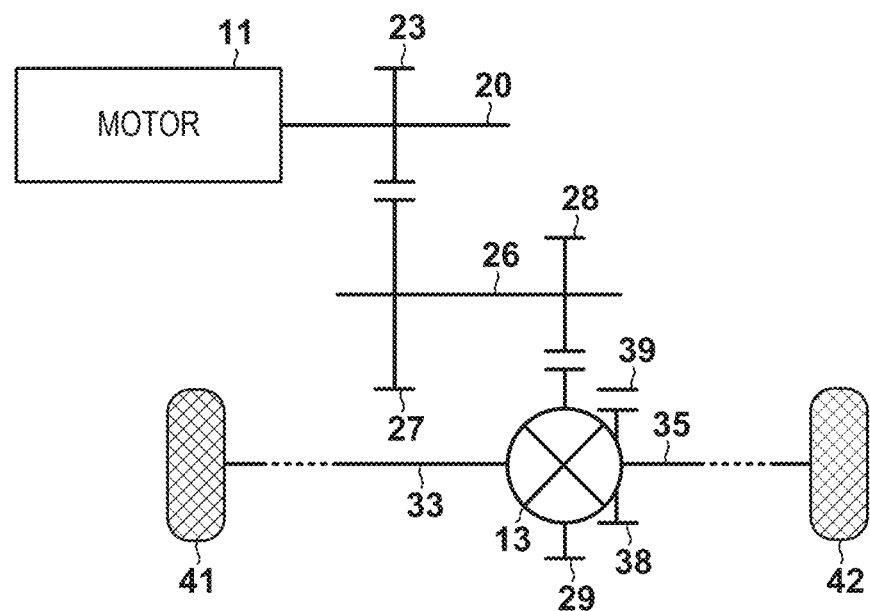
FIGS. 3A and 3B are each a schematic diagram for describing a configuration example of gears according to some embodiments.

Referring to FIGS. 2 and 3A, a configuration example of the power unit 2 of the vehicle V will be described. FIG. 2 is a cross-sectional view of the power unit 2. FIG. 3A is a schematic diagram in which the relationship among a motor 11, a plurality of gears, and a plurality of shafts is focused on, out of the component elements of the power unit 2. The power unit 2 may include component elements illustrated in FIG. 2. The power unit 2 may further include a component element not illustrated in FIG. 2, or may not necessarily include some of the component elements illustrated in FIG. 2.

As illustrated in FIG. 2, the power unit of the vehicle V includes the motor 11, a deceleration device 12, and a differential gear 13 in a housing 14. The motor 11 can be used as a drive source for accelerating the vehicle V, and can also be used as a power generator at the time of deceleration or the like. The housing 14 is divided into three parts in a vehicle width direction. Such three divided parts will be referred to as a left housing 15, a central housing 16, and a right housing 17 sequentially from the left side of the vehicle V. An accommodation portion 43 is defined between the left housing 15 and the central housing 16. An accommodation portion 44 is defined between the central housing 16 and the right housing 17.

The motor 11 is disposed in the accommodation portion 43. The motor 11 includes a motor shaft 20, a rotor 21, a stator 22, and a resolver 40. The motor shaft 20 is supported by the left housing 15 via a ball bearing 18, and is supported by the central housing 16 via a ball bearing 19. The rotor 21 is fixed to the motor shaft 20. The stator 22 surrounds the outer circumference of the rotor 21, and is fixed to the central housing 16. Oil is stored in a bottom portion of the housing 14.

The resolver 40 is a rotation angle sensor for detecting a rotation angle of the rotor 21. Instead of the resolver 40, another rotation angle sensor, for example, an encoder may be used. The rotation angle of the rotor 21 will be referred to as a rotation angle of the motor 11. The rotation angle of the rotor 21 is equal to the rotation angle of the motor shaft 20, which is fixed to the rotor 21. Furthermore, the rotation angle of the rotor 21 is equal to the rotation angle of a reduction gear 23, which is fixed to the motor shaft 20.

The deceleration device 12 is disposed in the accommodation portion 44. The deceleration device 12 includes the reduction gear 23, a reduction shaft 26, a reduction gear 27, a final drive gear 28, and a final driven gear 29. The reduction gear 23 is fixed to a tip end of the motor shaft 20, which protrudes on the right side beyond the central housing 16. The reduction shaft 26 is supported by the central housing 16 via an angular roller bearing 24, and is supported by the right housing 17 via an angular roller bearing 25. The reduction gear 27 and the final drive gear 28 are each fixed to the reduction shaft 26. The final driven gear 29 is fixed to the outer circumference of the differential gear 13. The reduction gear 27 meshes with the reduction gear 23. The final driven gear 29 meshes with the final drive gear 28.

The differential gear 13 is disposed in the accommodation portion 44. The outline of the differential gear 13 is configured with a differential case 30. The differential case 30 is supported by the central housing 16 via an angular roller bearing 31, and is supported by the right housing 17 via an angular roller bearing 32. An inboard joint 34 is provided at a tip end of a left output shaft 33, which is long and extends in a left direction from the differential case 30. The inboard joint 34 protrudes outward from the left housing 15. An inboard joint 36 is provided at a tip end of a right output shaft 35, which is short and extends in a right direction from the differential case 30. The inboard joint 36 protrudes outward from the right housing 17. The inboard joint 34 on the left side is connected with a left rear wheel 41 via a left half shaft (not illustrated). In addition, the inboard joint 36 on the right side is connected with a right rear wheel 42 via a right half shaft (not illustrated). A right end of the left output shaft 33 is supported by the differential gear 13. A left end of the left output shaft 33 is supported by the left housing 15 via a ball bearing 37.

The power unit 2 further includes a parking gear 38 and a parking pawl 39. The parking gear 38 is fixed to the differential case 30. The parking pawl 39 is fixed to the housing 14. Recess portions and protrusion portions are alternately formed in a circumferential direction on an outer circumferential surface of the parking gear 38. The parking pawl 39 includes a claw portion capable of meshing with the recess portion on the parking gear 38. The parking pawl 39 selectively meshes with the parking gear 38. That is, the parking pawl 39 can have a state of meshing with the parking gear 38 and a state of not meshing with the parking gear 38. When the shift lever 6*c* is in the parking range, the electronic control unit 1 causes the parking pawl 39 to mesh with the parking gear 38. This suppresses the rotation of the differential case 30, and maintains a stopped state of the vehicle V. The suppression of the rotation of a specific member may mean that such a specific member is relatively fixed to the vehicle body of the vehicle V. The electronic control unit 1 does not cause the parking pawl 39 to mesh with the parking gear 38, when the shift lever 6*c* is not in the parking range. This enables the differential case 30 to rotate so as to transmit the drive force generated by the motor 11 to the drive wheels.

In the vehicle V, the drive force generated by the motor 11 is transmitted to the drive wheels (the left rear wheel 41 and the right rear wheel 42 in the example of FIG. 3A) via a plurality of gears (in the example of FIG. 3A, the differential gear 13, the reduction gear 23, the reduction gear 27, the final drive gear 28, and the final driven gear 29).

Figure 3B:
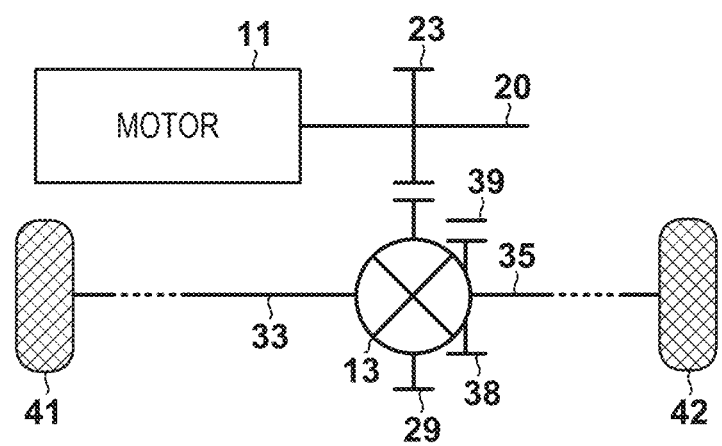

FIG. 3B illustrates a power unit 2 according to a modification. In the configuration illustrated in FIG. 3B, the power unit 2 does not include the reduction shaft 26, the reduction gear 27, or the final drive gear 28. The final driven gear 29 meshes with the reduction gear 23. Also in the modification of FIG. 3B, the drive force generated by the motor 11 is transmitted to the drive wheels (the left rear wheel 41 and the right rear wheel 42 in the example of FIG. 3A) via a plurality of gears (the differential gear 13, the reduction gear 23, and the final driven gear 29).

<Inspection Method of Gears>

Referring to the flowchart of FIG. 4, an inspection method for inspecting the vehicle V will be described. In this inspection method, worn states of the plurality of gears included in the power unit 2 are inspected. The inspection method of FIG. 4 may be performed by the electronic control unit 1 of the vehicle V. In this case, the electronic control unit 1 functions as an inspection device. Alternatively, the inspection method of FIG. 4 may be performed by an inspection device different from the electronic control unit 1. The inspection device may be mounted on the vehicle V, or may be outside the vehicle V. In a case where the inspection device is outside the vehicle V, data to be used for performing the inspection method of FIG. 4 may be transmitted from the vehicle V to the inspection device. In the following, a case where the electronic control unit 1 of the vehicle V performs the inspection method of FIG. 4 will be described. Each step in the inspection method of FIG. 4 may be performed, for example, by the processor 1*a* of the electronic control unit 1 executing a program stored in the memory 1*b* of the electronic control unit 1. Alternatively, some or all of the steps in the inspection method of FIG. 4 may be performed on a dedicated integrated circuit, such as an application specific integrated circuit (ASIC). The inspection method of FIG. 4 may be started in response to turning on of the power supply (for example, an ignition power supply) of the vehicle V.

In S401, the electronic control unit 1 determines whether the vehicle V has stopped. The electronic control unit 1 shifts processing to S402, in a case of determining that the vehicle V has stopped ("YES" in S401), and repeats S401 in the other case ("NO" in S401). Stop of the vehicle V means that the speed of the vehicle V is zero. The speed of the vehicle V may be calculated, based on, for example, the output of the wheel speed sensor 2*c*.

In S401, the electronic control unit 1 may further determine whether the parking mechanism of the vehicle V has been actuated, in addition to or instead of the vehicle V having stopped. In this case, the electronic control unit 1 performs the processing of S402 and later, in response to the actuation of the parking mechanism of the vehicle V The parking mechanism of the vehicle V may include the parking gear 38 and the parking pawl 39. Alternatively or additionally, the parking mechanism of the vehicle V may include the electric parking brake device 3*c*. The electronic control unit 1 actuates the parking mechanism in response to a change of the shift position of the vehicle V to the parking range. Specifically, the electronic control unit 1 causes the parking pawl 39 to mesh with the parking gear 38, in response to the change of the shift position of the vehicle V to the parking range. Additionally, the electronic control unit 1 may actuate the electric parking brake in response to the change of the shift position of the vehicle V to the parking range.

The determination in S401 may be made additionally, based on another condition. For example, a predetermined time (for example, 24 hours) having elapsed since the condition of S401 is satisfied last time or the vehicle V having traveled a predetermined distance (for example, 10 km) may be set as an additional condition. By additionally determining such a condition, the processing of S402 and later is suppressed from being performed excessively and frequently.

Figure 5A:
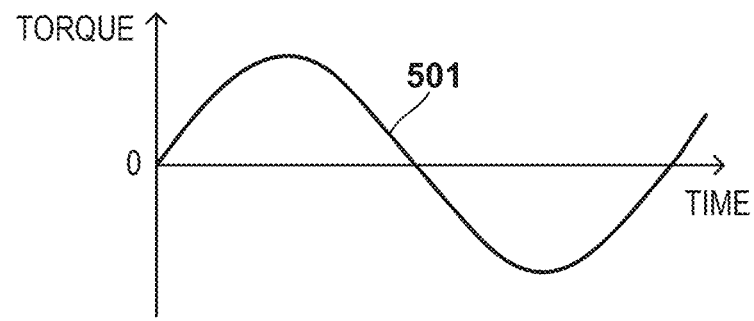
FIGS. 5A to 5C are diagrams for describing temporal changes in torque and rotation amount according to some embodiments.

In S402, the electronic control unit 1 causes the motor 11 to generate torque in two rotation directions different from each other, in a state where the vehicle V is stopped. The two rotation directions different from each other may be a clockwise direction and a counterclockwise direction around the motor shaft 20 of the motor 11. Referring to FIG. 5A, an example of the torque generated by the motor 11 will be described. The horizontal axis of a graph 501 in FIG. 5A represents an elapsed time since the motor 11 starts generating the torque. The vertical axis of the graph 501 in FIG. 5A represents the torque generated by the motor 11. One of the two rotation directions different from each other is defined as a positive direction, and a value of the torque for rotating in this direction is defined as positive. The other one of the two rotation directions different from each other is defined as a negative direction, and a value of the torque for rotating in this direction is defined as negative.

In the example of FIG. 5A, the electronic control unit 1 causes the motor 11 to generate torque of a sinusoidal wave having a cycle and an amplitude that are preset. Alternatively, the electronic control unit 1 may cause the motor 11 to generate torque of another waveform. The electronic control unit 1 causes the motor 11 to continue generating the torque for a preset time (for example, for 10 seconds) or a preset number of waves (for example, 10 waves). The electronic control unit 1 causes the motor 11 to generate the torque having an amplitude with which the stopped state of the vehicle V is maintained.

Figure 5B:
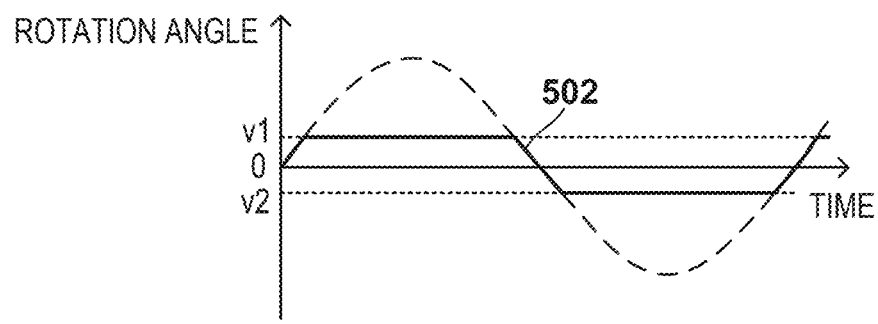

In S403, the electronic control unit 1 measures the rotation amount of the motor 11 in accordance with the torque generated in S402 in a state in which the vehicle V is stopped. The rotation amount of the motor 11 may be a range in which the rotation angle of the motor 11 can be included. The rotation angle of the motor 11 is measured by, for example, the resolver 40. Referring to FIG. 5B, an example of the rotation amount of the motor 11 will be described. The horizontal axis of a graph 502 in FIG. 5B represents an elapsed time since the motor 11 starts generating the torque. The vertical axis of the graph 502 in FIG. 5B represents the rotation angle of the motor 11. In the graph 502, the rotation angle at the time when the motor 11 starts generating the torque is set to 0.

As illustrated in FIG. 4A, while the parking pawl 39 meshes with the parking gear 38, the rotation of the differential case 30 of the differential gear 13 is suppressed. Therefore, the rotation of the final driven gear 29, which is relatively fixed to the differential case 30, is also suppressed. On the other hand, a backlash is present in the mesh between the final drive gear 28 and the final driven gear 29, and thus the final drive gear 28 is rotatable within a range of such a backlash. The backlash denotes a gap intentionally provided in the rotation direction. The final drive gear 28 is rotatable, and thus the reduction gear 27, which is relatively fixed to the final drive gear 28, is also rotatable similarly.

A backlash is also present in the mesh between the reduction gear 23 and the reduction gear 27. Therefore, the reduction gear 23 is rotatable within a total range of a range where the reduction gear 27 is rotatable and a range of such a backlash. Therefore, the motor shaft 20, which is relatively fixed to the reduction gear 23, is also rotatable. In the example of FIG. 5B, as illustrated in the graph 502, in response to generation of the positive torque by the motor 11, the motor 11 is rotatable until the rotation angle becomes v1. In response to the generation of the positive torque by the motor 11, the motor 11 is rotatable until the rotation angle becomes v2. The absolute value of v1 and the absolute value of v2 can take different values depending on the positional relationship of the gears when the torque starts to be generated. The electronic control unit 1 measures, as a rotation amount of the motor 11, a range (v1-v2) in which the motor 11 is rotatable while the vehicle V is in a stopped state.

Figure 5C:
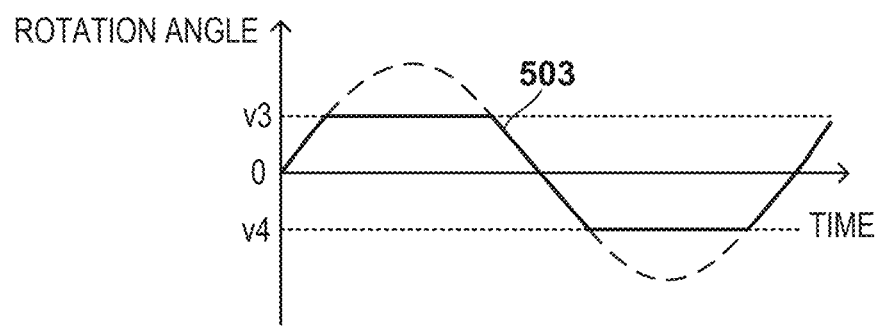

Referring to FIG. 5C, the rotation amount of the motor 11, when the backlash increases due to wear of the gear, will be described. The horizontal axis of a graph 503 in FIG. 5C represents an elapsed time since the motor 11 starts generating the torque. The vertical axis of the graph 503 in FIG. 5C represents the rotation angle of the motor 11. In the graph 503, the rotation angle at the time when the motor 11 starts generating the torque is set to 0.

In the example of FIG. 5C, as illustrated in the graph 502, in response to the generation of the positive torque by the motor 11, the motor 11 is rotatable until the rotation angle becomes v3. In response to the generation of the negative torque by the motor 11, the motor 11 is rotatable until the rotation angle becomes v4. Due to an increase in the backlash, the rotation amount (v3-v4) of the motor 11 in the case illustrated in the graph 503 is larger than the rotation amount (v1-v2) of the motor 11 in the case illustrated in the graph 502.

In S404, the electronic control unit 1 estimates the worn states of the plurality of gears included in the power unit 2, based on the rotation amount of the motor 11 measured in S403. For example, the electronic control unit 1 may calculate an index representing the worn states of the plurality of gears, based on the rotation amount of the motor 11 measured in S403. In the following description, the index representing the worn states of the plurality of gears will be referred to as a wear index. The electronic control unit 1 may use the rotation amount of the motor 11 measured in S403 as the wear index. Alternatively, a value obtained by subtracting the rotation amount of the motor 11 measured in the inspection before shipment of the vehicle V from the rotation amount of the motor 11 measured in S403 may be used as the wear index. Alternatively, a value obtained by dividing the rotation amount of the motor 11 measured in S403 by the rotation amount of the motor 11 measured in the inspection before shipment of the vehicle V may be used as the wear index. The rotation amount of the motor 11 measured in the inspection before shipment of the vehicle V may be stored in, for example, the memory 1*b* of the electronic control unit 1, or may be received from a server outside the vehicle V. The rotation amount of the motor 11 measured in the inspection before shipment of the vehicle V is an example of the rotation amount of the motor 11 in a state in which the wear of the plurality of gears is little. The rotation amount of the motor 11 measured at another point in time may be used.

The worn state represented by the wear index based on the rotation amount of the motor 11 measured in S403 represents the worn states of the gears on a torque transmission path from the motor 11 to the parking gear 38, out of the plurality of gears included in the power unit 2. Specifically, in the configuration example of FIG. 4A, the reduction gear 23, the reduction gear 27, the final drive gear 28, and the final driven gear 29 are included on the torque transmission path from the motor 11 to the parking gear 38. In the configuration example of FIG. 4B, the reduction gear 23 and the final driven gear 29 are included on the torque transmission path from the motor 11 to the parking gear 38. In the configuration examples of FIG. 4A or FIG. 4B, while the parking gear 38 is fixed to the left output shaft 33 or the right output shaft 35, the differential gear 13 is further included on the torque transmission path from the motor 11 to the parking gear 38.

As illustrated in FIG. 4A, in a case where a plurality of meshes (for example, the mesh between the reduction gear 23 and the reduction gear 27 and the mesh between the final drive gear 28 and the final driven gear 29) are included on the torque transmission path from the motor 11 to the parking gear 38, the electronic control unit 1 may calculate the wear index for each of the plurality of meshes. Hereinafter, such a calculation method will be specifically described.

A ratio of the reduction gear 27 to the reduction gear 23 is defined as "i1". A rotation amount of the reduction gear 27 with respect to the reduction gear 23 is defined as R1. A rotation amount of the final driven gear 29 with respect to the final drive gear 28 is defined as R2. R1 and R2 may change depending on the worn states of these gears. As a result of a pretest, assuming that it is known that in accordance with the wear of these gears, R1 and R2 change while satisfying the following relationship.

$$R2 = a \times R1 \qquad \text{(equation 1)}$$

"a" may be a constant, or may be a function corresponding to the total rotation amount of the motor 11. In this case, in a case where the rotation amount of the motor 11 is defined as R, $$R = R1 + R2 \times i1 \qquad \text{(equation 2)}$$

is established. "i1" is determined by the number of teeth of the reduction gear 23 and the number of teeth of the reduction gear 27, "a" is given by a pretest (and a current total rotation amount of the motor 11 depending on the case), and R is measured in S404. Therefore, by solving the equations 1 and 2 simultaneously, the electronic control unit 1 is capable of calculating R1 and R2. Then, the electronic control unit 1 calculates a wear index for the mesh between the reduction gear 23 and the reduction gear 27, based on R1, and calculates a wear index for the mesh between the final drive gear 28 and the final driven gear 29, based on R2. These wear indexes represent the respective worn states of the plurality of meshes.

The electronic control unit 1 may store the estimated worn state (for example, the wear index representing this) in the memory 1b in association with the current time, or may transmit the estimated worn state to a server outside the vehicle V.

In S405, the electronic control unit 1 determines whether the worn state estimated in S404 satisfies a predetermined condition. In a case of determining that the worn state satisfies the predetermined condition ("YES" in S405), the electronic control unit 1 shifts the processing to S406, and in the other case ("NO" in S405), the electronic control unit 1 shifts the processing to S401. The predetermined condition may be a condition indicating that replacement of a gear included in the power unit 2 is recommended. For example, the predetermined condition may be the fact that the wear index calculated in S404 exceeds a predetermined threshold. Such a threshold may be set and stored in the memory 1b beforehand. When the wear index is calculated for each of the plurality of meshes, the predetermined condition may be the fact that at least one of the plurality of wear indexes exceeds the predetermined threshold. A threshold of a different value may be set for each of the plurality of wear indexes.

In S406, the electronic control unit 1 notifies that the plurality of gears included in the power unit 2 are worn. The notification in S406 may be given to the driver of the vehicle V, with use of, for example, the information output device 5. Alternatively or additionally, the notification in S406 may be given to the owner or the administrator of the vehicle V. S406 may be omitted. In a case of not determining in S405 that the predetermined condition is satisfied, the electronic control unit 1 inspects the worn state of the gear again, when the vehicle V stops next time.

According to the above-described embodiments, the worn state of the gear is estimated with use of the motor 11, which is the drive source of the vehicle V, so that the worn state of the gear can be estimated with a simple configuration. In addition, the motor 11 generates torque in a state in which the vehicle V is stopped, so that the worn state of the gear can be estimated with accuracy. By estimating the worn state of the gear with accuracy in this manner, the product life of the gear can be prolonged. Furthermore, according to some embodiments, the worn state is estimated for each of the plurality of meshes, so that the worn state of the gear can be estimated with more accuracy.

Summary of Embodiments

[Item 1]
An inspection device (1) for inspecting a vehicle (V) in which drive force generated by a motor (11) is transmitted to a drive wheel (41, 42) via a plurality of gears (23, 27, 28, 29), the inspection device comprising:
a generation unit (S402) configured to cause the motor to generate torque in two rotation directions different from each other, in a state in which the vehicle is stopped; and
an estimation unit (S404) configured to estimate worn states of the plurality of gears, based on a rotation amount of the motor in accordance with the torque in the state in which the vehicle is stopped.
According to this item, the worn state of the gear can be estimated with a simple configuration.

[Item 2]
The inspection device according to Item 1, wherein the generation unit causes the motor to generate the torque in response to actuation of a parking mechanism (38, 39, 3c) of the vehicle.
According to this item, it becomes possible to suppress an unintentional movement of the vehicle.

[Item 3]
The inspection device according to Item 2, wherein the parking mechanism is actuated in response to a change of a shift position of the vehicle to a parking range.
According to this item, it is possible to identify that the parking mechanism is actuated.

[Item 4]
The inspection device according to Item 2 or 3, wherein the parking mechanism includes: a parking gear (38); and a parking pawl (39) that selectively meshes with the parking gear.
According to this item, the stopped state of the vehicle can be maintained with certainty.

[Item 5]
The inspection device according to Item 4, wherein the estimation unit estimates a worn state of a gear on a torque transmission path from the motor to the parking gear, out of the plurality of gears.
According to this item, the gear, the worn state of which can be estimated, becomes clear.

[Item 6]
The inspection device according to Item 5, wherein
on the transmission path, the plurality of gears include:
a first gear (23);
a second gear (27) that meshes with the first gear;
a third gear (28); and
a fourth gear (29) that meshes with the third gear, and
the estimation unit estimates the worn state of each of meshes between the first gear and the second gear and between the third gear and the fourth gear.
According to this item, the worn state of the gear can be estimated with accuracy.

[Item 7]
The inspection device according to any one of Items 1-6, further comprising a notification unit (S406) configured to notify that the plurality of gears are worn in response to the worn states that have been estimated satisfying a predetermined condition.
According to this item, the user is able to grasp the worn state of the gear.

[Item 8]
A vehicle (V) comprising the inspection device according to any one of Items 1-7.
According to this item, the above effect is provided in the form of a vehicle.

[Item 9]
A method for inspecting a vehicle (V) in which drive force generated by a motor (11) is transmitted to a drive wheel (41, 42) via a plurality of gears (23, 27, 28, 29), the method comprising:
causing (S402) the motor to generate torque in two rotation directions different from each other, in a state in which the vehicle is stopped; and
estimating (S404) worn states of the plurality of gears, based on a rotation amount of the motor in accordance with the torque in the state in which the vehicle is stopped.
According to this item, the worn state of the gear can be estimated with a simple configuration.

The invention is not limited to the foregoing embodiments, and various variations/changes are possible within the spirit of the invention.

What is claimed is:

1. An inspection device for inspecting a vehicle in which drive force generated by a motor is transmitted to a drive wheel via a plurality of gears, the inspection device comprising:
   a generation unit configured to cause the motor to generate torque in two rotation directions different from each other, in a state in which the vehicle is stopped; and
   an estimation unit configured to estimate worn states of the plurality of gears, based on a rotation amount of the motor in accordance with the torque in the state in which the vehicle is stopped.

2. The inspection device according to claim 1, wherein the generation unit causes the motor to generate the torque in response to actuation of a parking mechanism of the vehicle.

3. The inspection device according to claim 2, wherein the parking mechanism is actuated in response to a change of a shift position of the vehicle to a parking range.

4. The inspection device according to claim 2, wherein the parking mechanism includes: a parking gear; and a parking pawl that selectively meshes with the parking gear.

5. The inspection device according to claim 4, wherein the estimation unit estimates a worn state of a gear on a torque transmission path from the motor to the parking gear, out of the plurality of gears.

6. The inspection device according to claim 5, wherein on the transmission path, the plurality of gears include:
   a first gear;
   a second gear that meshes with the first gear;
   a third gear; and
   a fourth gear that meshes with the third gear, and
   the estimation unit estimates the worn state of each of meshes between the first gear and the second gear and between the third gear and the fourth gear.

7. The inspection device according to claim 1, further comprising a notification unit configured to notify that the plurality of gears are worn in response to the worn states that have been estimated satisfying a predetermined condition.

8. A vehicle comprising the inspection device according to claim 1.

9. A method for inspecting a vehicle in which drive force generated by a motor is transmitted to a drive wheel via a plurality of gears, the method comprising:
   causing the motor to generate torque in two rotation directions different from each other, in a state in which the vehicle is stopped; and
   estimating worn states of the plurality of gears, based on a rotation amount of the motor in accordance with the torque in the state in which the vehicle is stopped.

* * * * *